July 31, 1928.  1,679,170
J. F. O'BRIEN
VELOCIPEDE
Filed March 25, 1926  3 Sheets-Sheet 1
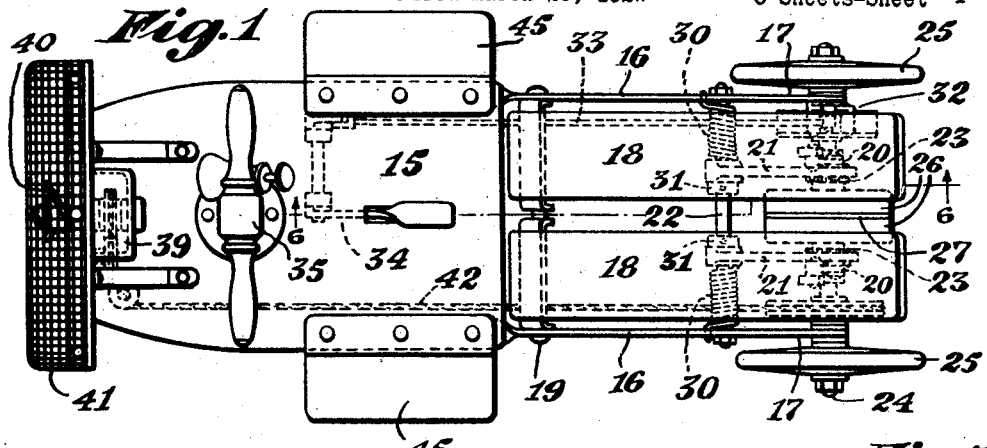
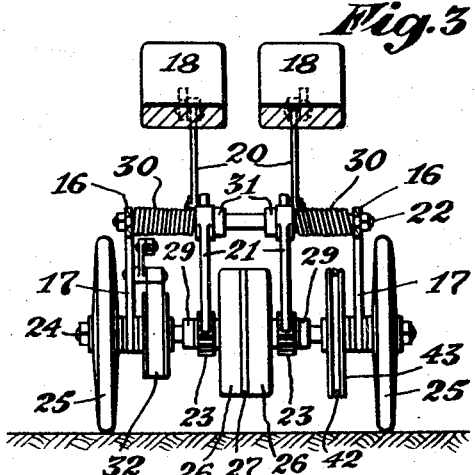
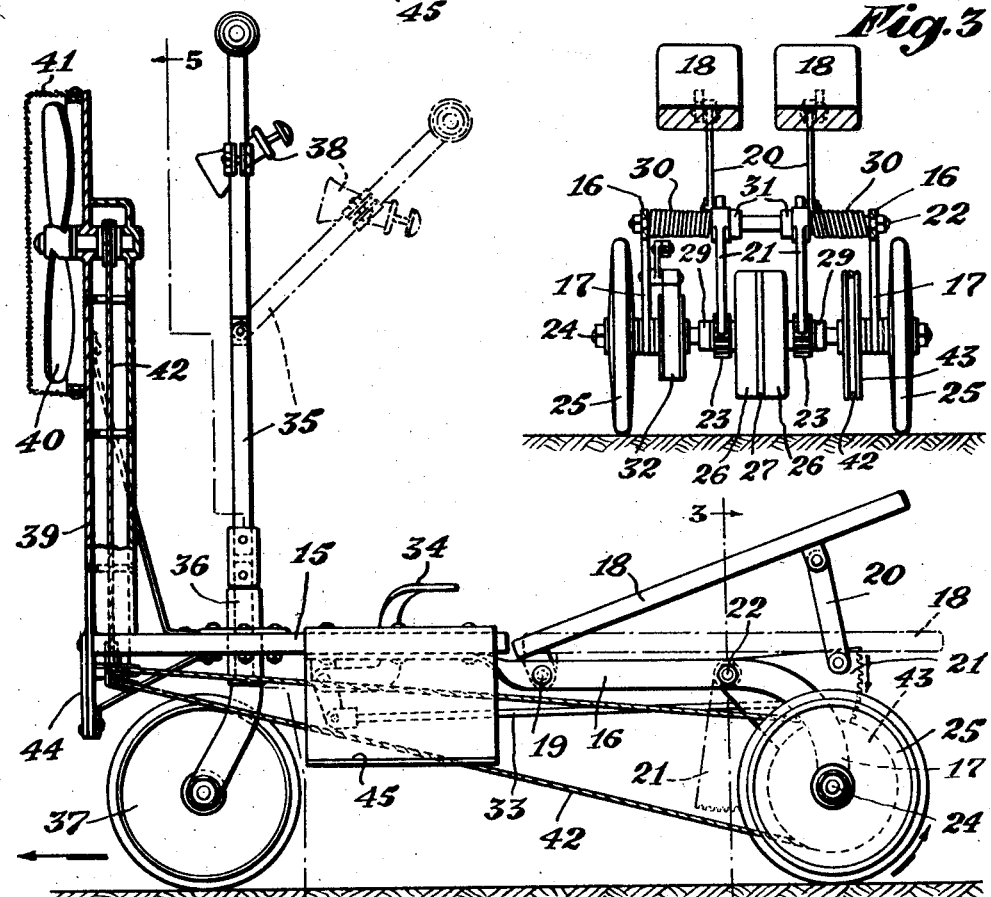
INVENTOR
James F. O'Brien.
BY
James C. Sproll
ATTORNEY July 31, 1928.
J. F. O'BRIEN
VELOCIPEDE
Filed March 25, 1926
1,679,170
3 Sheets-Sheet 2
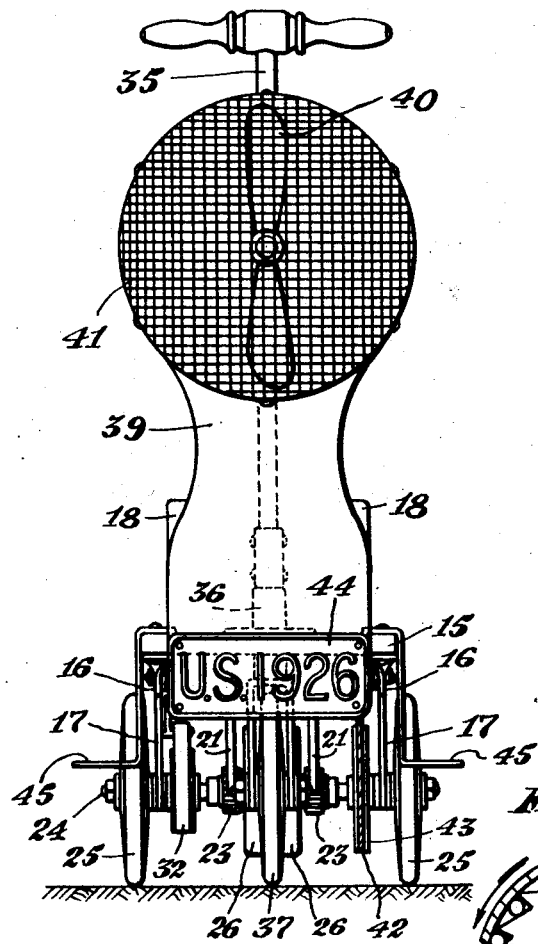
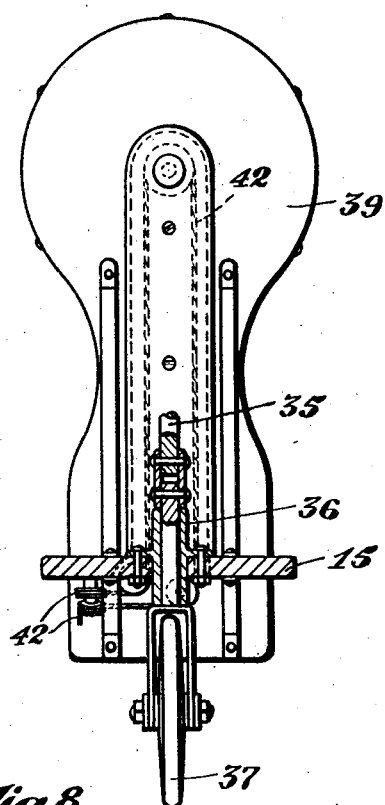
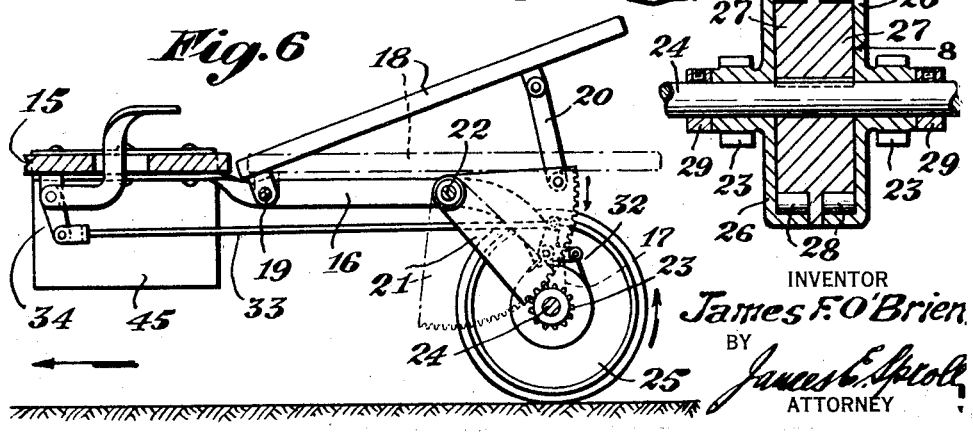
INVENTOR
James F. O'Brien
BY
ATTORNEY

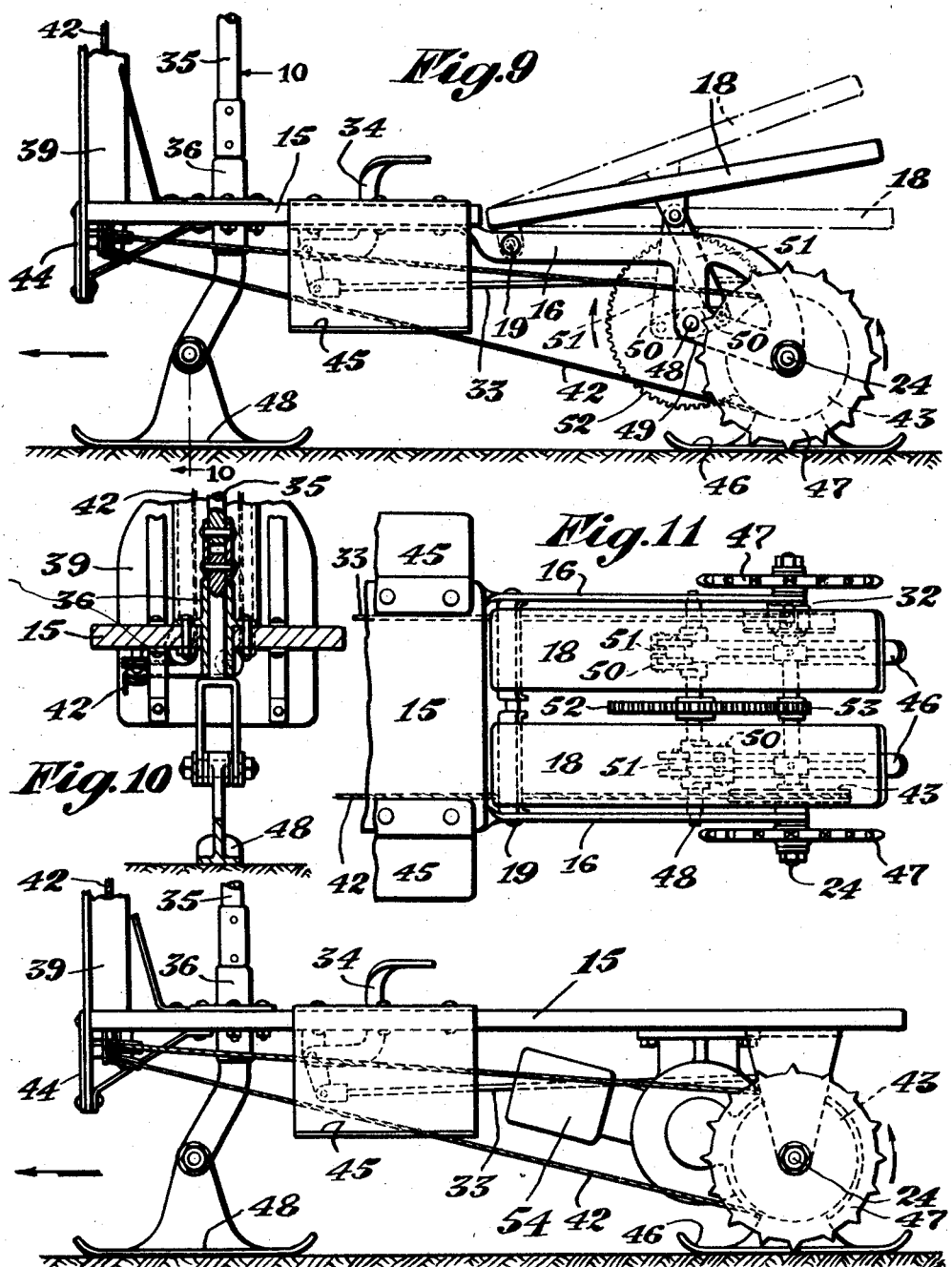

Patented July 31, 1928.

1,679,170

UNITED STATES PATENT OFFICE.

JAMES F. O'BRIEN, OF SEATTLE, WASHINGTON.

VELOCIPEDE.

Application filed March 25, 1926. Serial No. 97,199.

The present invention relates to the type of velocipedes generally known as scooters and the primary aim and object thereof is the provision of a manually operable velocipede readily and quickly convertible from the wheeled type to the sled type, or the reverse, whereby such velocipede may be used in the open air in all seasons for propulsion upon any kind of surface under the complete and positive braking and directional control of the operator at all times and at variable speeds as desired.

Contemplated by the present invention is the provision of a scooter embodying improvements directed particularly to the manually propelling mechanism thereof operable by the feet of the rider acting upon oscillative treadles interconnected therewith, said mechanism containing novel noiseless ratchet mechanisms for converting the oscillative movement of said treadles into continuous rotative movement of the driving wheels of said scooter; novel steering mechanism for said scooter; brake mechanism therefor; screw propeller mechanism interconnected with and driven by the vehicle propelling mechanism; and in novel runners and driving wheels interchangeable with the usual wheels of the scooter for converting the same into a sled and propelling the latter upon snow, ice, or other slippery surfaces, all of which are important objects of my invention and are to be correlated in the broad aim of enhancing the efficiency of the device for general use.

The above and additional objects which will hereinafter be more specifically treated, are attained by such means as are shown in the accompanying drawings, described in the following specification and then more clearly pointed out in the claims, which are appended hereto and form part of this application.

With reference to the drawings wherein is illustrated the preferred embodiment of the invention, with several modified forms thereof, and throughout the several views of which like characters of reference designate similar parts, Figure 1 is a top plan view of the velocipede or scooter comprehended by my present invention;

Fig. 2 is a side elevation thereof, certain parts being broken away for clarity of illustration;

Fig. 3 is a vertical transverse section taken through 3—3 of Fig. 2;

Fig. 4 is a front end elevation of the same;

Fig. 5 is a vertical transverse section taken through 5—5 of Fig. 2;

Fig. 6 is a fragmentary longitudinal section taken through 6—6 of Fig. 1;

Fig. 7 is a vertical central section of a noiseless ratchet mechanism mounted upon the rear axle shaft of the device;

Fig. 8 is a fragmentary vertical section taken through 8—8 of Fig. 7;

Fig. 9 is a fragmentary side elevation of a modified form of scooter;

Fig. 10 is a fragmentary transverse vertical section of the same taken through 10—10 of Fig. 9;

Fig. 11 is a fragmentary top plan view of the rear or driving end thereof; and

Fig. 12 is a fragmentary side elevation of another modified form of scooter.

The numeral 15 designates a platform having spaced parallel side frame members 16 rigidly secured thereto and extending rearwardly therefrom substantially in prolongation to and alignment with the side edges thereof, said frame members terminating at their rear ends in downwardly bent or arcuate portions 17.

Oscillative treadles 18 are pivotally or hingedly connected at their forward ends to the side frame members 16 by a transversely disposed hinge pin or rod 19, the ends of which are mounted in any suitable manner within the said frame members in close proximity to the rear end of the platform 15. The oscillative treadles 18 upon their undersides and adjacent their rear ends are pivotally connected by depending links 20 to sector shaped gears 21 mounted for oscillative movement upon a transversely disposed rod or shaft 22 rigidly secured at its ends within the side frame members 16 in proximity to the downwardly bent portions 17 thereof.

The sector shaped gears 21 normally mesh with pinions 23 mounted for oscillative movement upon a rear axle shaft 24 journalled for rotation adjacent its outwardly projecting ends within the terminals of the downwardly bent portions 17 and having rear driving wheels 25 fixedly secured upon said ends in any well known manner. The oscillative pinions 23 are integrally or otherwise rigidly connected upon their inner faces to inwardly projecting oscillative cylindrical ratchet casings 26, which normally enclose interconnected ratchet wheels 27 keyed or splined to the rear axle shaft 24, substantially midway the length thereof. Interposed between the inner walls of each of the casings 26 and the teeth of the correlated ratchet wheels thereof is a series of rollers or balls 28, which latter function as dogs therebetween to interlock the casing and wheel, when the pinion associated with such casing is moved in the direction indicated by the arrow in Fig. 8, whereby the driving wheels 25 are rotated in the direction indicated by the arrows in Figs. 2 and 6, to propel the device of the invention in a forward direction, and which function to unlock said casing from the ratchet wheel during reverse and independent rotative movement of the casing thereon, as and when the pinion associated therewith is moved by its sector shaped gear in a direction opposite to that indicated.

Set collars 29 fixedly secured upon the rear axle shaft 24 serve to retain the oscillative ratchet casings 26 in normally abutting rotation with the ratchet wheels 27 and against axial movement upon said shaft.

Torsional retraction springs 30 mounted upon the rod 22 and interposed between the side frame members 16 and the oscillative sector shaped gears 21 are rigidly secured at their outer ends to said members and are similarly secured at their inner ends to said gears, whereby and whereat said springs serve and function to return the sector shaped gears and the treadles associated therewith to inoperative positions following each power stroke thereof. Set collars 31 fixedly secured to the rod 22 function to prevent axial movement of the sector shaped gears 21 thereon.

Mounted upon the rear axle shaft 24, in an obvious manner, is a brake mechanism 32, of well known form, connected by a forwardly extending articulated brake rod 33 to a brake pedal mechanism 34 pivotally mounted, within convenient reach of the operator or rider, upon the underside of the platform slotted thereat to accommodate the same.

An articulated vertically disposed steering column or rod 35 is mounted for free oscillative movement adjacent its lower bifurcated end within a cylindrical guide sleeve 36 rigidly secured within the medially apertured platform 15 in proximity to the forward end thereof, said column having a detachable front or steering wheel 37 rotatively mounted within its bifurcated lower end, and upon the upper or handle portion thereof is provided with a detachable horn or Klaxon 38, of any well known form.

Rigidly secured to and suitably braced upon the forward end of the platform 15 is a hollow standard 39 having a screw propeller 40 journalled for rotation within the upper end thereof, said propeller being normally enclosed by a guard cage 41, of wire mesh or other suitable material, rigidly secured to the front face of said hollow standard, to thereby effectually prevent injury to the operator or rider of the device. A suitably guided belt or cable 42 connects the propeller 40 with a sheave 43 fixedly secured to the rear axle shaft 24, whereby such propeller is rotated during the forward movements of the vehicle, as will be manifest and apparent. Detachably secured to the front face and adjacent the lower end of the hollow standard 39 is a rectangular display plate 44 having any desired symbols or characters superimposed thereon, as for example, the letters U. S. and the numerals 1926, which latter serves to materially embellish and enhance the appearance of the device.

The numeral 45 designates steps rigidly secured to the sides of the platform 15 to facilitate and expedite the mounting or dismounting of the operator upon or from the device.

In the operation of the device the rider assumes a standing position upon the oscillative treadles 18 and alternately exerts downward pressure thereon causing alternate oscillative movement of the sector shaped gears 21 and correlated pinions 23 thereof, which movement is converted and imparted by the cylindrical casings 26 and ratchet wheels 27 to the rear axle shaft 24 as continuous rotary motion. The gear ratio between the sector shaped gears 21 and pinions 23 is such that the device is driven or propelled forwardly at considerable speed, which latter may be varied as desired depending upon the downwardly directed energy or pressure exerted by the operator upon the treadles 18.

In Figs. 9 to 11, inclusive, the device of the invention is illustrated, as converted to a sled for use upon ice or snow, which is accomplished by mounting longitudinally disposed runners 46 upon the rear axle shaft 24 to support or carry the rear end of the device and removing the rear driving wheels 25 and substituting therefor toothed driving wheels 47, whereby greater traction is obtained upon slippery surfaces. The front wheel 37 is also removed from the steering column 35 and a longitudinally disposed runner 48 substituted therefor to support and steer the forward end of the device.

The converted device in the present instance is shown as equipped with an alternative form of manually operable propelling mechanism, embodying a crank shaft 48 journalled for rotation at its ends within downwardly and forward extending brackets 49 integrally formed upon or otherwise rigidly secured to the lower edges and rear ends of the side frame members 16, said crank shaft having cranks 50 formed thereon, which are pivotally interconnected to the lower faces of the oscillative treadles 18 by links 51. Rigidly secured to the crank shaft 48, substantially midway the length thereof, is a gear 52, which normally meshes with a pinion 53 similarly secured to the rear axle shaft 24, whereby the rotary motion of the crank shaft 48 is geared up and is imparted to the rear axle shaft 24 to rotate the latter at considerable speed. The alternative form of propelling mechanism is actuated by the oscillative treadles 18 substantially in a manner similar to that hereinbefore set forth for the preferred form of manually operable propelling mechanism.

In Fig. 12 the manually propelled sled is converted to a self-propelled device by extending the platform 15 rearwardly and substituting an internal combustion engine 54, of any suitable type, for the oscillative treadle actuated mechanism hereinbefore shown and described, said engine being rigidly secured to the underside of the platform 15 and connected to the rear axle shaft 24 in any well known and desired manner.

Manifestly, therefore, the device of the invention is readily and quickly convertible from the wheeled type to the sled type, or the reverse; is similarly convertible from the manually propelled type to the self-propelled type, or the reverse; and may be used in the open air in all seasons for propulsion upon any kind of surface and is under the complete and positive control of the operator or rider at all times.

While I have herein shown and described the invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of such construction may be resorted to without departing from the invention or the benefits derivable therefrom. I also desire it to be understood that certain features of the invention herein shown and described may be employed in and with other combinations than those herein shown.

What I claim as my invention, and desire to secure by Letters Patent, is:—

1. In a velocipede, in combination, a mobile body having front steering and rear driving wheels, a manually operable oscillative treadle attached to said body, mechanism interconnecting said rear driving wheels and treadle for actuation by the latter to propel the body in a forward direction, and a screw propeller rotatively mounted upon one end of said body for actuation by the mechanism thereof.

2. In a velocipede, in combination, a mobile body, a manually operable oscillative treadle attached thereto, propelling mechanism for said body interconnected with said treadle embodying means for converting oscillative motion of the treadle to continuous rotary motion of the propelling mechanism, a screw propeller rotatively mounted upon the forward end of said body for actuation by said propelling mechanism, and protective means for enclosing said screw propeller.

3. In a velocipede, in combination, a steerable mobile body, manually operable and alternately actuated oscillative treadles attached thereto, propelling mechanism for said body interconnected with said treadles for alternate actuation thereby to propel the body in a forward direction, a standard rigidly secured to said body, a screw propeller operatively mounted upon said standard and connected to said propelling mechanism for actuation thereby, and a protective cage rigidly secured to said standard in concentric relation to said screw propeller for enclosing the same.

4. In a velocipede, in combination, a mobile body, propelling mechanism for said body, and a screw propeller rotatively mounted upon said body for actuation by said propelling mechanism.

In testimony whereof I affix my signature.

JAMES F. O'BRIEN.